United States Patent [19]

Schikowsky et al.

[11] Patent Number: 4,733,718

[45] Date of Patent: Mar. 29, 1988

[54] HEAT EXCHANGER BODIES MADE OF PLASTIC

[75] Inventors: Hartmut Schikowsky, Darmstadt; Heinz Gross, Muehltal; Herbert Helm, Weiterstadt; Klaus E. Poehlmann, Darmstadt; Karl-Heinrich Schanz, Muehltal; Heinz Vetter, Rossdorf, all of Fed. Rep. of Germany

[73] Assignee: Roehm GmbH Chemische Fabrik, Darmstadt, Fed. Rep. of Germany

[21] Appl. No.: 751,530

[22] Filed: Jul. 3, 1985

[30] Foreign Application Priority Data

Jul. 4, 1984 [DE] Fed. Rep. of Germany ... 8419977[U]
Oct. 4, 1984 [DE] Fed. Rep. of Germany ... 8429157[U]

[51] Int. Cl.⁴ .............................................. F28D 17/00
[52] U.S. Cl. ......................................... 165/4; 165/10; 165/905; 261/95; 219/243; 156/73.5
[58] Field of Search ................... 165/10, 4, 166, 905, 165/902; 261/94, 95

[56] References Cited

U.S. PATENT DOCUMENTS 4,512,392  4/1985  Van Ee et al. .................. 165/166
4,512,393  4/1985  Maendel ........................... 165/166

FOREIGN PATENT DOCUMENTS 2751115  5/1979  Fed. Rep. of Germany .

Primary Examiner—Albert W. Davis, Jr.
Attorney, Agent, or Firm—Oblon, Fisher, Spivak, McClelland & Maier

[57] ABSTRACT

Heat exchanger or heat accumulator bodies which are simple to produce. The bodies consist of a stack of extruded hollow chamber panels with plane smooth outer walls and webs that join the outer walls in a single piece. The hollow chamber panels are joined to one another in the stack on the front side by locking connections. The locking connections can be produced with an inserted electrical band heater, by glue seams, or by undercut interlockings. The hollow chamber panels are not joined to one another in the in-between areas or are not everywhere joined in the in-between areas.

6 Claims, 8 Drawing Figures

HEAT EXCHANGER BODIES MADE OF PLASTIC

FIELD OF THE INVENTION

The invention relates to heat exchanger bodies or heat accumulator bodies for application according to the recuperator or regenerator principle. In the case of the recuperator principle, the heat exchange takes place between two media at different temperatures simultaneously flowing through separate channels. In the case of the regenerator principle, all channels are alternately flowed through by a hotter and a colder medium, whereby the latter absorbs the heat absorbed in the heat exchanger or heat accumulator body. The last named principle is the preferred field of application of the subject heat exchanger bodies.

The invention relates to exchange or accumulator bodies. A multiplicity of the exchange or accumulator bodies may be placed in a heat exchanger which, depending on the application, can be equipped with feed and removal pipes. In the case of use as a regenerator, such pipes are not necessary in most cases.

BACKGROUND OF THE INVENTION

For cooling towers and similar heat exchanger installations with high output, heat exchangers with very large heat exchange or accumulator surfaces are necessary. For the economical operation of such heat exchange installations, providing of inexpensive heat exchanger bodies able to be connected side by side and in series in large number is of decisive importance. Numerous attempts have been made to stack together as heat exchanger bodies profiles extruded from plastic which can be produced cheaply. Thus, in West German Published Patent Document DE-OS No. 27 51 115 it is proposed, among many other embodiments, to join, in a stack, extruded hollow chamber panels made of plastic. The chamber panels comprise two plane smooth outer walls and one-piece webs held in place between them by means of an adhesive applied to the outer walls. However, this joining process is too expensive for mass production.

SUMMARY OF THE INVENTION

The invention is a heat exchanger or heat accumulator body that is particularly easy and inexpensive to produce. The heat exchanger body comprises a stack of extruded hollow chamber panels with plane smooth outer walls and webs that join the outer walls in a single piece. The hollow chamber panels are joined to one another in the stack on the front side by locking connections, which can be produced with a inserted electric band heater, by glue seams, or by undercut interlockings. The hollow chamber panels are not joined to one another in the in-between areas or are not everywhere joined in the in-between areas.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein.

DETAILED DESCRIPTION OF THE PRESENTLY PREFERRED EMBODIMENTS

Figure 1:
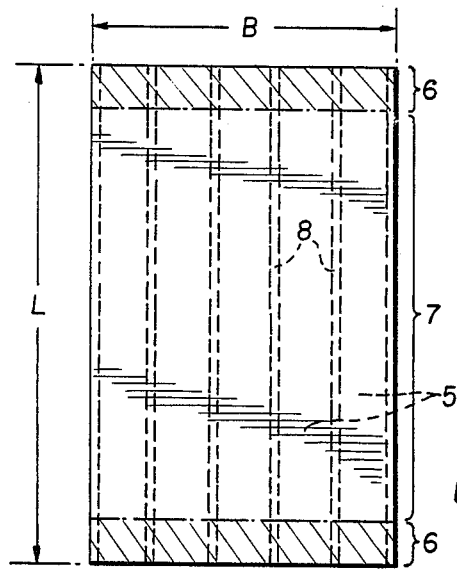
FIG. 1 is a plane view of a heat exchanger body according to a first embodiment of the invention.
Figure 2:
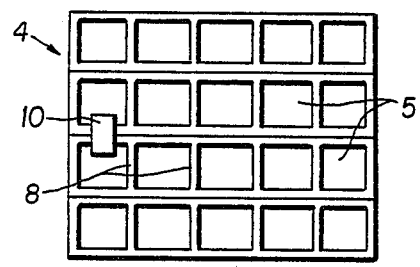
FIG. 2 shows the front surface of the body represented in FIG. 1.
Figure 3:
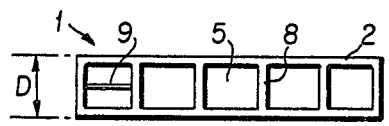
FIG. 3 shows the front surface of an individual panel in the body shown in FIGS. 1 and 2.
Figure 4:
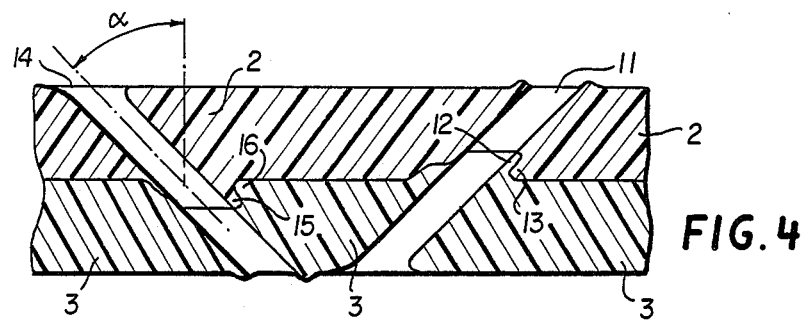
FIG. 4 shows a cutout, in enlarged representation, from the front surface shown in FIG. 2.
Figure 5:
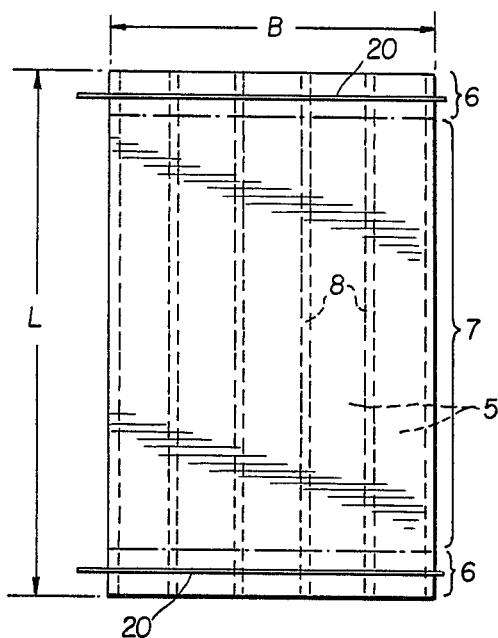
FIG. 5 is a plane view of a second embodiment of the invention.
Figure 6:
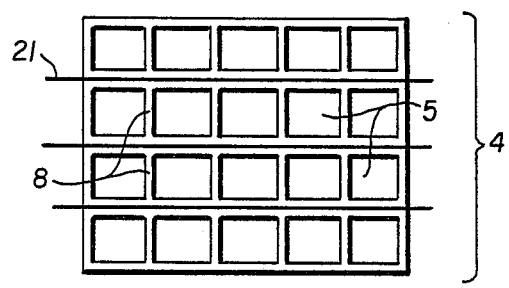
FIG. 6 shows the front surface of the body represented in FIG. 5.
Figure 7:
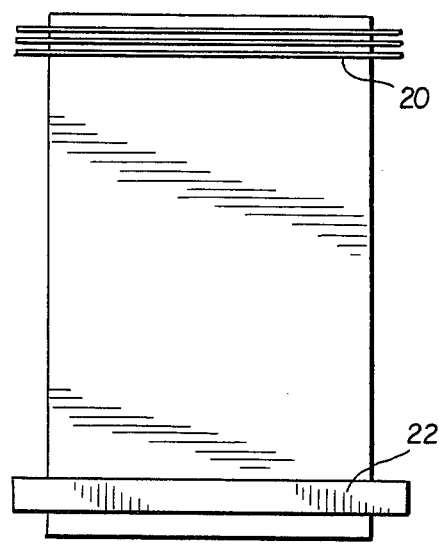
FIGS. 7 and 8 show other variants of the second embodiment.

The invention is based on the knowledge that a joining of hollow chamber panels into a stack is considerably simpler and cheaper to produce if the hollow chamber panels are joined only in the area of the front surfaces with the adjacent hollow chamber panels than if total surface gluing of the wall surfaces is performed, yet a heat exchanger body joined in this way has no technical disadvantages. In fact, heat exchanger body in this way is more reliable in operation and cheaper to assemble and to maintain than a panel stack held together only by outside clamping means.

In the embodiment shown in FIGS. 1 through 4, panels 1 containing hollow chamber 5 separated by webs 8 have plane smooth outer walls 2, 3. Thus, a multiplicity of panels 1 can be put together into a stack 4 in which the outside walls of adjacent panels 1 are in contact over the entire surface of the outer walls 2, 3 with one another. This contact guarantees an adequate heat transfer when the stack 4 is simultaneously flowed through by two different media according to the recuperator principle. In this case, connection of the feed and removal pipes can be made easier by the fact that the direction of the hollow chambers 5 in the panels 1 following one another in the stack 4 in each case are placed at right angles to one another. Collecting caps can be placed on the side surfaces of the panel stack, and the feed and removal pipes for each of the two media can be connected to opposite side surfaces.

In heat exchangers according to the regenerator principle, heat transfer between individual hollow chambers does not matter, since all channels are flowed through by the same medium. In this case, it is advantageous if the hollow chambers 5 in all panels 1 of a stack 4 run parallel to one another.

The stack 4 as a rule consists of more than 2, preferably from 5 to 100, individual panels 1 joined to one another. According to the invention, the panels 1 are joined to one another in the area of the front surfaces. The front surfaces are those surfaces, represented in FIG. 2 for the stack 4 and in FIG. 3 for the individual panel 1, to which the hollow chambers 5 lead. The joining can be produced in a narrow area 6 of the outer walls 2, 3 which is represented hatched in FIG. 1, but optionally can also be limited to the front surfaces themselves. As a rule, it is sufficient if there is a joining only in the area of the front surfaces, and the outer walls 2, 3 of the panels 1 are in contact without joining in the entire in-between area 7. One or more additional joining zones in the in-between area 7 can be advantageous in some cases.

The individual panels 1 are produced by extrusion from thermoplastic plastic. The plastic must be resistant to the media which, in use, will flow through panels 1 and have a softening temperature above the highest operating temperature. As long as these conditions are met, all extrudable plastics can be used—e.g., polyethylene, polypropylene, polystyrene, polyvinyl chloride, and polymethacrylate. Polycarbonate and polysulfone plastics can be used for operating temperatures over 100° C. to about 120° C. Polyphenylene oxides, polyetherimides, or polyethersulfones, for example, can be used for operating temperatures up to 150° C. The thermoplastic plastic can contain incorporated particles with a higher heat capacity—for example, carbon black or metal particles.

Advantageous measurements of the hollow chamber panels are a length L of 500 mm to 3000 mm, a width B of 300 mm to 2000 mm and a thickness D of 3 mm to 30 mm, but these measurements are not critical. The outer walls 2, 3 and the webs 8 can have a thickness—generally about the same—of 0.5 mm to 5 mm, corresponding to static requirements at the operating temperature. The hollow chambers 5 are defined by the webs 8 and the in-between sections of the outer walls 2, 3. The webs 8 can be perpendicular or oblique to the outer walls 2, 3. The hollow chambers 5 can also be divided by partitions 9.

Heat transfer between the flowing medium and the panels 1 is improved if the medium flows in a turbulent manner. This can be achieved, for example, by corrugation of the webs 8 in the longitudinal direction. Processes for the production of hollow chamber panels with corrugated webs are known.

Joining in the area of the front surfaces can be produced by heat welding. For this purpose, for example, a heated tool is allowed to sink from the front surfaces into the hollow chambers 5, and the outer walls 2, 3 of adjacent panels 1 are pressed on one another after the fusion. However, some plastics are difficult to weld or cannot be welded at all. In this case, the panels 1 can be glued in the area 6 or, if this cannot be done, can be mechanically joined. Clamping elements 10 can be used for this purpose, which in each case grab two adjacent outer wall 2, 3 sections. The clamping elements 10 can be made of metal or of a suitable plastic. In the latter case, the clamping elements 10 can be produced on site by injection molding.

A preferred type of joining of plastics that cannot be welded is interlocking. For this purpose, the outer surfaces are formed in the area of the front surfaces so that they exhibit a series of elevations and depressions that interlock. Advantageously, the interlocking elements are provided with undercuts which prevent separation perpendicular to the plane of the panels.

A simple but very effective joining process consists in guiding a tool, heated above the melting point of the plastic, at a depth of penetration of 1 mm to 5 mm obliquely across the front surface of the built up stack 4, whereby a groove 11 is made in the front surface. On the contact surfaces of two outer walls 2, 3, the tool draws a nose 12 from the material of one outer wall 3 into the other outer wall 2. The nose 12 forms an undercut with adjacent material 13 by the oblique position of groove 11. If several grooves 11, 14 are placed in the same front surface in oblique positions running in opposite directions, undercuts 12/13 and 15/16 work together so that they effectively prevent separation of the panels. The depth of the undercut increases with the angle α (shown in FIG. 4) of the oblique position. The angle α should be at least 30° and preferably 40° to 60°. The width of the grooves is not important and is determined by the thickness of the tool. It can be about 1 mm to 5 mm.

A suitable tool, for example, is a heated cylinder perpendicular to the front surface that is guided by a mechanical moving device in a zigzag path over all contact lines of adjacent panels 1 of the entire stack 4. The distance between two grooves 11, 11 should not be more than 500 mm and preferably is 5 mm to 100 mm.

Figure 8:
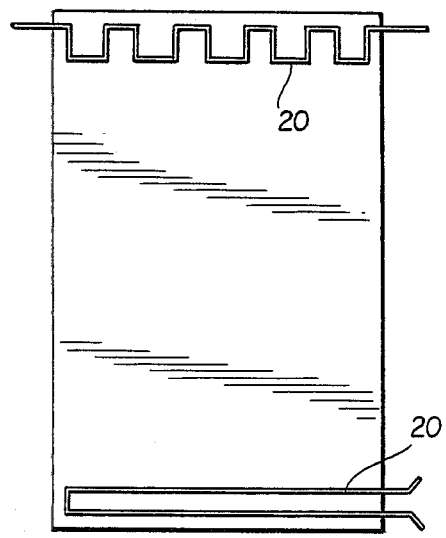

In the embodiments according to FIGS. 5 to 8, joining in the area of the front surfaces is performed by heat welding by band heaters 20. During the putting together of the stack 4, the band heaters 20 are laid close to the front sides and parallel to the front sides between two panels 1 to be joined. Ends 21 of each band heater 20 project from the stack 4 far enough for a voltage source to be left outside. After heat welding, the projecting ends can be cut off. A straight band heater 20 laid on each front side is usually sufficient. However, if necessary a wider heat welding zone can be formed if several band heaters 20 are laid next to one another (as shown at the top in FIG. 7) or one or more band heaters 20 are placed in corrugated or loop form, as shown in FIG. 8.

Prior to heat welding, the stack 4 with the inserted band heaters 20 is held together under pressure by suitable devices. Then a voltage is applied in each case to the ends of the band heaters 20, which causes a heating of the adjacent plastic zones to the melting range of the plastic. The heated zones in the vicinity of a band heater 20 are heat welded to one another under pressure. As soon as this condition is reached, which generally is the case in 1 to 20 seconds, the voltage is removed from the band heaters 20 and the welding site is allowed to cool.

The band heaters 20 laid in a stack 4 can be heated all simultaneously or can be heated individually or in groups by the applying of a suitable voltage. The band heaters 20 remain in the heat welded heat exchanger body or heat accumulator body. The voltage is selected to be so high that the band heater 20 quickly reaches a temperature in the melting range of the plastic. It suffices to exceed the melting temperature only slightly—e.g., by 5° C. to 20° C. If the melting temperature is exceeded by more than that, thermal decomposition phenomena, bubble formation, or stress cracks can occur in the plastic.

The voltage necessary for heating the band heaters 20 depends on their resistance and length. The voltage is advantageously set at a value which is empirically determined with a suitable regulator. Suitable band heaters 20 are, e.g., 0.1 mm to 2 mm thick wire or 2 mm to 20 mm wide and 0.1 mm to 1 mm thick flat bands 22 (shown in FIG. 7). The latter advantageously consist of a plait of individual resistance wires. However, the band heaters 20 can also consist of other conductive substances, such as varnishes or pastes.

Normal operating voltages are in the range of 5 to 80 AC or DC volts. If the panels 1 have a tendency toward stress cracks during heat welding, it can be advantageous to gradually raise the voltage during a longer period to the necessary peak value and to gradually lower the voltage after heat welding. In this way, drastic temperature differences in a tight space can be avoided.

The technique of joining plastic parts by inserted electrically heatable metal bands to produce heat exchangers is known from West German Published Patent Document DE-OS No. 32 12 295, inter alia. However, this document does not disclose the joining in a multilayer heater exchanger body of hollow chamber panels which, already closed all around, comprise open channels only on the front sides.

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by Letters Patent of the United States is:

1. A heat accumulator body for a regenerator, said heat accumulator body being made of plastic and comprising a stack composed of a plurality of extruded hollow chamber panels with plane smooth outer walls and webs that join the outer walls into a single piece, said plurality of hollow chamber panels lying on one another with their outer walls in surface contact, said plurality of hollow chamber panels being joined in the area of their front sides with adjacent hollow chamber panels in the stack and not being joined in at least a part of the in-between area, said plurality of hollow chamber panels being heat welded to one another in the area of the front sides.

2. A heat accumulator body according to claim 1 wherein the hollow chambers in said plurality of hollow chamber panels run parallel to one another in all of said plurality of hollow chamber panels.

3. A heat accumulator body according to claim 1 wherein the outer walls of said plurality of hollow chamber panels all have the same dimensions.

4. A heat accumulator body for a regenerator, said heat accumulator body being made of plastic and comprising a stack composed of a plurality of extruded hollow chamber panels with plane smooth outer walls and webs that join the outer walls into a single piece, said plurality of hollow chamber panels lying on one another with their outer walls in surface contact, said plurality of hollow chamber panels being joined in the area of their front sides with adjacent hollow chamber panels in the stack and not being joined in at least a part of the in-between area, said plurality of hollow chamber panels being heat welded together by a plurality of band heaters that have been heated to a temperature in the melting range of the plastic by application of voltage.

5. A heat accumulator body according to claim 4 wherein the hollow chambers in said plurality of hollow chamber panels run parallel to one another in all of said plurality of hollow chamber panels.

6. A heat accumulator body according to claim 4 wherein the outer walls of said plurality of hollow chamber panels all have the same dimensions.

* * * * *